United States Patent
Mason

(10) Patent No.: US 10,364,016 B2
(45) Date of Patent: Jul. 30, 2019

(54) COMPONENT BONDING METHOD AND STRUCTURE

(71) Applicant: AIRBUS OPERATIONS LIMITED, Bristol (GB)

(72) Inventor: Stephen J. Mason, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 881 days.

(21) Appl. No.: 14/646,123

(22) PCT Filed: Nov. 7, 2013

(86) PCT No.: PCT/GB2013/052918
§ 371 (c)(1),
(2) Date: May 20, 2015

(87) PCT Pub. No.: WO2014/080173
PCT Pub. Date: May 30, 2014

(65) Prior Publication Data
US 2015/0291274 A1 Oct. 15, 2015

(30) Foreign Application Priority Data
Nov. 21, 2012 (GB) .................................. 1220929.2

(51) Int. Cl.
*B64C 3/20* (2006.01)
*C09J 5/06* (2006.01)
(Continued)

(52) U.S. Cl.
CPC .................. *B64C 3/20* (2013.01); *C09J 5/06* (2013.01); *F16B 11/006* (2013.01);
(Continued)

(58) Field of Classification Search
CPC ..... H01L 33/54; H01L 33/62; H01L 33/0079; H01L 2924/01079; H01L 2924/01078;
(Continued)

(56) References Cited

U.S. PATENT DOCUMENTS 3,560,291 A * 2/1971 Foglia et al. ........... B32B 27/00
156/229
6,613,170 B1 * 9/2003 Ohno .................... B29C 66/452
156/272.2
(Continued)

FOREIGN PATENT DOCUMENTS

DE 102009039029 A1 3/2011
GB 2108425 A 5/1983

OTHER PUBLICATIONS

International Search Report and Written Opinion dated Dec. 22, 2014 in International Application No. PCT/GB2013/052918 filed Nov. 7, 2013.
(Continued)

*Primary Examiner* — Amber R Anderson
*Assistant Examiner* — Nahid Amiri
(74) *Attorney, Agent, or Firm* — Nixon & Vanderhye P.C.

(57) ABSTRACT

A method of bonding two components at a joint interface using a UV-curable substance. The method comprises incorporating a UV radiation emitting device in the joint interface between the components together with said substance and supplying power to said UV radiation emitting device to generate UV radiation and cure the substance.

9 Claims, 2 Drawing Sheets

(51) Int. Cl.
*F16B 11/00* (2006.01)
*B29C 65/48* (2006.01)
*B29C 65/14* (2006.01)
*B29C 65/34* (2006.01)
*B29C 65/00* (2006.01)
*B29L 31/30* (2006.01)

(52) U.S. Cl.
CPC ...... *B29C 65/1406* (2013.01); *B29C 65/1432* (2013.01); *B29C 65/1467* (2013.01); *B29C 65/344* (2013.01); *B29C 65/3468* (2013.01); *B29C 65/4845* (2013.01); *B29C 66/1122* (2013.01); *B29C 66/45* (2013.01); *B29L 2031/3085* (2013.01); *C09J 2205/302* (2013.01); *C09J 2205/31* (2013.01)

(58) Field of Classification Search
CPC ............... H01L 27/156; H01L 27/1214; Y10T 403/477; Y10T 403/478; B64C 3/20; B29C 65/14; B29C 65/1403; B29C 65/1406; B29C 65/344; B29C 65/1432; B29C 65/1467; B29C 65/4845; B29C 66/45; B29C 66/1122; B29L 2031/3085; C09J 5/06; C09J 2205/31; C09J 2205/302; F16B 11/006
USPC .................... 403/270, 271; 156/272.2–275.5
See application file for complete search history.

(56) References Cited

U.S. PATENT DOCUMENTS

| | | | | |
|---|---|---|---|---|
| 6,977,025 | B2* | 12/2005 | McArdle | G03F 7/34 156/247 |
| 7,741,151 | B2* | 6/2010 | Amrine | H01L 21/568 257/E21.499 |
| 7,829,384 | B2* | 11/2010 | Omandam | H01L 21/6836 257/E23.001 |
| 7,878,644 | B2* | 2/2011 | LaFleche | B41J 11/0015 347/101 |
| 7,884,544 | B2* | 2/2011 | Takezawa | B29C 45/0013 313/501 |
| 7,991,257 | B1* | 8/2011 | Coleman | B29D 11/0073 264/1.24 |
| 8,761,565 | B1* | 6/2014 | Coleman | F21V 5/002 362/335 |
| 8,953,926 | B1* | 2/2015 | Kelly | H05B 33/02 362/335 |
| 9,076,970 | B2* | 7/2015 | De Kok | H01L 51/0097 |
| 9,647,189 | B2* | 5/2017 | Tischler | H01L 33/62 |
| 2004/0021255 | A1* | 2/2004 | Bilanin | B29C 35/0272 264/494 |
| 2005/0136210 | A1* | 6/2005 | Boettcher | B29C 65/3436 428/76 |
| 2008/0302481 | A1 | 12/2008 | Berger et al. | |
| 2008/0306454 | A1* | 12/2008 | Sikora | A61L 2/10 604/265 |
| 2012/0000601 | A1* | 1/2012 | Fessler-Knobel | B23Q 3/084 156/275.5 |
| 2013/0134396 | A1* | 5/2013 | Shimomura | H01L 51/5012 257/40 |
| 2014/0361328 | A1* | 12/2014 | Shimamura | H01L 33/504 257/98 |
| 2015/0207099 | A1* | 7/2015 | Kao | H01L 51/5237 257/40 |

OTHER PUBLICATIONS

International Preliminary Report on Patentability and Written Opinion of the International Searching Authority in corresponding International Application No. PCT/GB2013/052918. dated Jun. 4, 2015.

* cited by examiner

COMPONENT BONDING METHOD AND STRUCTURE

RELATED APPLICATIONS

The present application is a National Phase of International Application Number PCT/GB2013/052918, filed Nov. 7, 2013, which claims priority to Great Britain Application Number 1220929.2, filed Nov. 21, 2012.

INTRODUCTION

The present invention relates to a method of bonding two components at a joint interface using a UV curable substance. A structure comprising two components, which may form parts of an aircraft wing, bonded to each other at a joint interface using a UV curable substance is also disclosed.

BACKGROUND

Conventional adhesives, such as 2 part epoxy adhesives, can be heat cured or allowed to cure at room temperature. However, both these methods take time and the application of heat requires the entire component to be placed in an oven. UV curable substances have the advantage that full cure can be achieved in a rapid manner and without the need for additional heating processes. However, a problem with using a substance of this type is that it is not possible to expose the substance to UV radiation when it is located in a bond interface between components made from opaque material.

SUMMARY OF THE INVENTION

The present invention seeks to provide a method and a structure formed according to the method which overcomes or substantially alleviates the aforementioned problems.

According to the invention, there is provided a method of bonding two components at a joint interface using a UV-curable substance comprising incorporating a LTV radiation emitting device in the joint interface together with said substance and activating said UV radiation emitting device to generate UV radiation and cure the substance.

In one embodiment, the method includes the step of activating the UV emitting device by supplying power to it through wires extending from the UV emitting device out of the joint interface.

In another embodiment, the method includes the step of supplying power to said UV emitting device wirelessly by induction.

The present invention also provides a method of separating components bonded according to the method of the invention and which comprises the step of re-activating the UV radiation emitting device for a period of time sufficient to cause the previously cured substance to degrade.

According to the invention, there is also provided an aircraft wing comprising components bonded using the method according to the invention.

According to the invention, there is also provided a structure comprising two components bonded to each other at a joint interface using a UV curable substance, comprising a UV radiation emitting device embedded in said joint interface to which power has been supplied to generate UV radiation to cure the substance.

In a preferred embodiment, the UV radiation emitting device comprises a plurality of spaced UV radiation emitting elements.

The UV radiation emitting elements may be formed in a grid with spaces between said elements.

The radiation emitting elements preferably include holes or gaps therebetween through which the substance can flow.

In some embodiments, the UV radiation emitting device includes feed wires extending from the joint interface for connection of a power source thereto.

The UV radiation emitting elements may be OLED's.

Preferably, said UV curable substance is an adhesive or a sealant.

The bonded components may comprise parts of an aircraft wing.

DETAILED DESCRIPTION OF THE EMBODIMENTS

Figure 1:
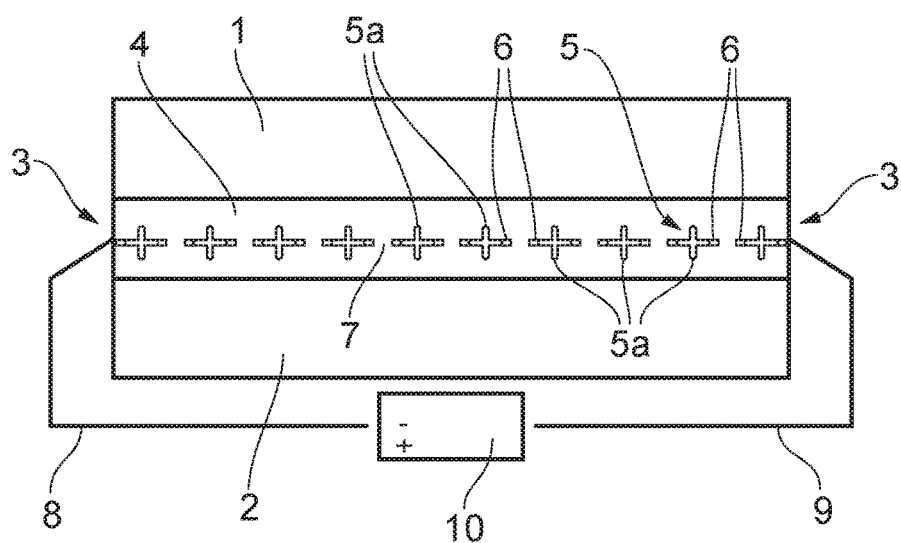
FIG. 1 shows a schematic view of a UV light generating device embedded in a joint interface between two substrates, according to an embodiment of the invention.

FIG. 1 shows two components, each having a substrate 1, 2 joined at a joint interface 3 using an ultra violet (UV) curable substance such as an adhesive or sealant 4. A UV radiation emitting device 5 is embedded in the substance 4 in the joint interface 3.

The UV radiation emitting device 5 can comprise a number of separate UV light emitting elements 5a or OLED's (Organic Light Emitting Devices). Preferably, the elements 5a are arranged on a grid or other mat or framework 6, but have holes, gaps or spaces 7 between them to allow the substance 4 to flow through and around the device 5 and thereby bond the substrates 1, 2 together without acting as a barrier between the bondable surfaces. The elements 5a are all connected to each other electrically.

Wires 8, 9 extend from the device 5 so that power may be supplied to all of the elements sa from a power source 10.

When two components are to be bonded, one or both substrates 1, 2 are coated with the UV curable adhesive 4 at the joint interface and the LTV radiation emitting device 5 is embedded in the adhesive 4. The components are then brought together and clamped in the required position. Power is then supplied to the elements 5a for a predetermined period of time so that they generate UV radiation sufficient to cure the UV curable adhesive 4. Once curing is complete, the power source 10 may be disconnected and the wires may be cut off. The UV radiation emitting device remains embedded in the bonded components.

Figure 2:
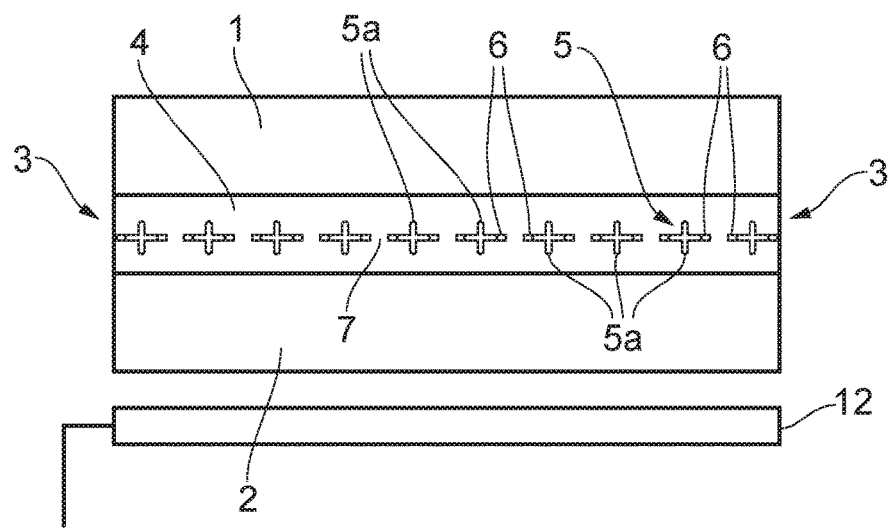
FIG. 2 shows a schematic view of a UV light generating device embedded in a joint interface between two substrate, according to at least one embodiment of the invention.

In an alternate embodiment, power may be supplied to the device 5 wirelessly via an induction coil 12, as seen in FIG. 2, or the UV light emitting device may be activated in some other way.

Although a number of different UV radiation emitting devices may be used, OLED's are preferred as they have a thin geometry, are of low cost, have low energy consumption and are robust and flexible.

The components being joined may form part of an aircraft wing, as joints of this type are easier to make and much lighter than using nuts and bolts to connect components together.

In addition to bonding two components, it is also envisaged that components that have been bonded with a UV emitting device embedded in the joint interface can also be separated more easily by activating the UV emitting device for a prolonged length of time sufficient to cause the cured UV adhesive to degrade.

It will be appreciated that the foregoing description is given by way of example only and that modifications may be made to the support assembly of the present invention without departing from the scope of the appended claims.

The invention claimed is:

1. A method of bonding two components at a joint interface using a UV-curable substance, comprising:
   embedding a UV radiation emitting device in the joint interface together with said substance, wherein the UV radiation emitting device comprises a plurality of spaced UV radiation elements, forming the plurality of UV radiation emitting elements in a grid having spaces between the UV radiation emitting elements, and
   activating said UV radiation emitting device by supplying power wirelessly by induction to said UV radiation emitting device incorporated in the joint interface to generate UV radiation by the UV radiation emitting device and cure the substance with the UV radiation.

2. The method of separating components bonded according to the method of claim 1 comprising re-activating the UV radiation emitting device for a period of time sufficient to cause the previously cured substance to degrade.

3. An aircraft wing comprising the components bonded using the method according to claim 1.

4. A structure comprising two components bonded to each other at a joint interface using a UV curable substance, comprising a UV radiation emitting device embedded in said joint interface which has been activated wirelessly by induction to generate UV radiation to cure the substance, wherein the UV radiation emitting device comprises a plurality of spaced UV radiation elements, and wherein the plurality of UV radiation emitting elements is formed in a grid having spaces between the UV radiation emitting elements.

5. The structure according to claim 4, wherein the spaces include holes or gaps therebetween through which the substance can flow.

6. The structure according to claim 4, wherein said UV radiation emitting elements are OLED's.

7. The structure according to claim 4, wherein said UV curable substance is an adhesive.

8. The structure according to claim 4, wherein said UV curable substance is a sealant.

9. The structure according to claim 4, wherein said components comprise parts of an aircraft wing.

* * * * *